US006234801B1

(12) United States Patent
Hsu

(10) Patent No.: US 6,234,801 B1
(45) Date of Patent: May 22, 2001

(54) COLOR COMPARISON LIST FOR DISPLAYING OF THE COLOR SYSTEM

(75) Inventor: Yun-Peng Hsu, Tao-Yuan Hsien (TW)

(73) Assignee: Zenith Color-Tech Corporation, Taipei (TW)

(*) Notice: Subject to any disclaimer, the term of this patent is extended or adjusted under 35 U.S.C. 154(b) by 0 days.

(21) Appl. No.: 09/488,836

(22) Filed: Jan. 21, 2000

(51) Int. Cl.[7] .................................................. G09B 19/00
(52) U.S. Cl. .................................................. 434/98
(58) Field of Search .................................................. 434/98, 103, 104; 345/150, 149

(56) References Cited

U.S. PATENT DOCUMENTS 824,374 * 6/1906 Munsell .................................. 434/98
1,617,024 * 2/1927 Munsell .................................. 434/98
2,866,277 * 12/1958 Wise .................................. 434/98
3,120,065 * 2/1964 Gaudier-Pons .................................. 434/98
3,229,385 * 1/1966 DePauw .................................. 434/98
3,474,546 * 10/1969 Wedlake .................................. 434/98
3,722,109 * 3/1973 Jacobson .................................. 434/103
4,211,016 * 7/1980 Eldar .................................. 434/98
4,665,394 * 5/1987 Coles .................................. 340/815.1
4,796,888 * 1/1989 Louez .................................. 273/58 R
4,878,977 * 11/1989 Kueppers .................................. 156/264
5,012,299 * 4/1991 Sawamura .................................. 355/326
5,026,286 * 6/1991 Hellwig .................................. 434/98
5,033,963 * 7/1991 Bourges .................................. 434/98
5,123,745 * 6/1992 Augur .................................. 356/421
5,174,758 * 12/1992 Abramson .................................. 434/98
5,452,017 * 9/1995 Hickman .................................. 348/646
5,627,951 * 5/1997 Chaplin .................................. 395/131
5,751,847 * 5/1998 Wuyts .................................. 382/165
5,842,866 * 12/1998 Chow .................................. 434/98
5,844,542 * 12/1998 Inoue .................................. 345/150
5,943,143 * 8/1999 Kawai .................................. 358/520

* cited by examiner

*Primary Examiner*—Jacob K. Ackun, Jr.
*Assistant Examiner*—Kurt Fernstrom
(74) *Attorney, Agent, or Firm*—Rosenberg, Klein & Lee

(57) ABSTRACT

A hue comparison device allows to precisely identify each hue by three attributes: hue angle, hue chroma, and hue depth. The device includes a number of hue sheets stacked together in a predetermined sequence. Each hue sheet contains a central standard gray area surrounded by hue blocks arranged in coaxial hue circles. Angular position of each hue block relative to a predetermined reference point on the hue sheet defines the color (i.e., the position of the hue on the spectral scale). The hue blocks of each hue circle are located at equal distance from the central standard gray area of the hue sheet. The hues of each hue circle have a predetermined chroma parameter which increases from a hue circle to the next hue circle in the direction from the center to the periphery of the hue sheet in predetermined increments. The difference in the number of hue blocks between adjacent hue circles equals six (6) hue blocks. In each hue sheet, the central standard gray area determining the depth of hues on the hue sheet, and is obtained by mixing together any three (3), or multiple of three (3), hues equidistanced along the same hue circle.

3 Claims, 10 Drawing Sheets

COLOR COMPARISON LIST FOR DISPLAYING OF THE COLOR SYSTEM

BACKGROUND OF THE INVENTION

1. Field of the Invention

The invention relates to a color comparison device which can be used as a unified color language standard based an standard gray to identify the color depth, where a color is precisely identified by three attributes: hue angle, chroma and depth.

2. Prior Art

The fact that there is a lack of a common language and a lack of a standardized color scale in the communication of color among color related industries has impeded color conveyance and created difficulties in advancing the state of the art in industry. In order to overcome this problem, especially seeing that today's information age demands information be exchanged rapidly and accurately, there is a pressing need for the development of a unified color language for use by industry and by academia, in research and education, so to increase the competitiveness of products and promote the advancement of the state of the art in industry.

In the field of chromatics, color systems are composed of hue, chroma and value. As shown in FIG. 8A, a 3-dimensional color system includes hue sheets, where each hue sheet (HS) is centered on a colorless value axis (VA). This color solid has a non-color value axis (VA) at its center with lighter values at the top and darker values on the bottom. Of all values, white (W) is the lightest and black (B) is the darkest. Also, chroma (C) extends radially outward from the non-color axis (VA) as shown in FIG. 8B. How to standardize and communicate color has long been a goal that colorists have strived to attain. Even though each country in the world has researched its own type of color solid and color language, no single one has been widely accepted by the color industry. From this it can be seen that a color language and a color solid have yet to be developed in an ideal form.

The basic colors of the Munsell notation system, shown in FIGS. 9A and 9B, are red (R), yellow (Y), green (G), blue (B), purple (P). With the colors yellow-red (YR), yellow-green (YG), blue-green (BG), blue-purple (BP) and red-purple (RP) making the basic major hues. As shown in FIG. 9B, their value are indicated by eleven stages, No. 0, No. 1, No. 2, No. 3 . . . No. 10, with black (BL) being No. 0, white (W) No. 10 and nine stages of gray in between. The method of representing chroma was to set the non-color at 0 and represent the stages of hue increase by the numbers 1, 2, 3 . . . .The highest chroma for each pure color differs at each stage, according to the different hues. Red (R) has the most stages with 14. Therefore, the Munsell notation system is complex due to its chroma stages (FIG. 9A).

FIG. 10 represents the Ostwald notation system. As shown in FIG. 10B, the system contains 8 determinant colors: yellow (Y), orange (O), red (R), purple (P), blue (UB), blue-green (T), green (SG), and yellow-green (LG). Each type of color of the eight types of primary hues is divided into 24 hues. For instance, with the hue yellow, the standard yellow primary hue is placed at the center with different hues indicated on its left and right, making a total of three hues. The symbols 1Y, 2Y and 3Y are added with 2Y representing the primary hue. The other hues are indicated in an identical manner. As seen in the color solid, shown in FIG. 10A, the Ostwald notation system is a very useful notation system for matching colors, but the shortcoming in this type of arrangement is that its value stages are not well ordered.

In FIG. 11, one can see the practical color coordinate system (P.C.C.S.) developed by the Japanese Color Research Institute. The special characteristic of this notation system is that it provides an appropriate combination of color matching sheets and also makes use of the strengths of the Munsell notation system and Ostwald notation system. Each hue has its own number and all the colors have the same kind of numbering. According to the P.C.C.S. differentiation method, red containing purple (PR) is the first of the hue numbers; number two is red (R); number three is red containing yellow; number four is orange containing red (RO). By passing through the hues yellow (Y), green (G), blue (B), purple (P), and red-purple (RP) once in the circle, red-purple becomes the hue number twenty-four and then advances to red (R).

In addition, there exist numerous different color theories on which the current international systems are based; however, they are all identical with respect to that they all use the three level structure of hue, chroma and value.

THE PROBLEMS RESOLVED BY THE INVENTION

In conventional three attribute systems, the hue plays a dominant role and therefore ordinarily the hue is separately discussed causing the chroma and value to be combined together and transformed for use as a color depth value. This is because changes in the color depth are not just single directional changes in the chroma or value, but result from the strong tendency for both the chroma and value to change simultaneously. Strictly speaking, these attributes should be added to the hue to make a three dimensional color system. Yet, because of the independence of the hue, they would rather say that the hue does not interfere with its merging with color depth, than to say that this way makes it extremely natural in its perception. Therefore, in this technical field when stating the expected color changes in coloring through dyes and pigments has extremely high correlation with the matching the proper degree of color depth. In other words, chroma and value use precise quantitative changes whereas color depth can be said not to possess a definite quantity properties with respect to the coloring quantity. In summary, chroma and value are color standards not representative of color quantity, i.e., only color depth possesses real quantitative properties of a color. Physical quantitative changes in color cannot be characterized only by chroma and value. This is because changes in color commonly can not just be determined by singular changes in its chroma or value. Therefore, in fields that use coloring materials, color depth plays an important role in quantification of the properties of a color.

Color depth is referred to as a quantity of an abstract color. In this way, a numerical value can certainly be used to express color. However, though we wish to express color depth in the form of a numerical value, it is very difficult to succeed in doing so no matter how many tests are carried out. To this day, we are still in a trial stage of its development. From this, one can see that chroma and value possess a strong mutual correlation and thus should be considered as a single combined property of a color. At the same time, we cannot clearly express color depth in a quantitative manner. From this we can see the importance of color depth to colorists who have worked hard to advance the research in this field. Disadvantageously, the color structure using hue, chroma and value as the attributes of the color is not a clear solution to the quantification problem of the color depth.

SUMMARY OF THE INVENTION

The objective of the invention is to make a color solid from the theoretical framework of hue angle, chroma and depth attributes that clearly distinguishes each of their unique characteristics so that tendency to change in same direction will not create confusion. By simply combining hue angle with chroma, any hue (light) color can be clearly identified. And if the concept of value can be integrated into the chroma, the same hue square of the same chroma has the same value. The present invention provides for a logical, scientific calculation method that allows to obtain quantitative parameter of the color depth, thus achieving the goals of convenient and precise color language conveyance, color measurement and color design.

DESCRIPTION OF THE DRAWINGS

FIGS. 1O(A)–(B) are sketches of the Ostwald notation system;

DETAILED DESCRIPTION OF THE PREFERRED EMBODIMENTS

Figure 1:
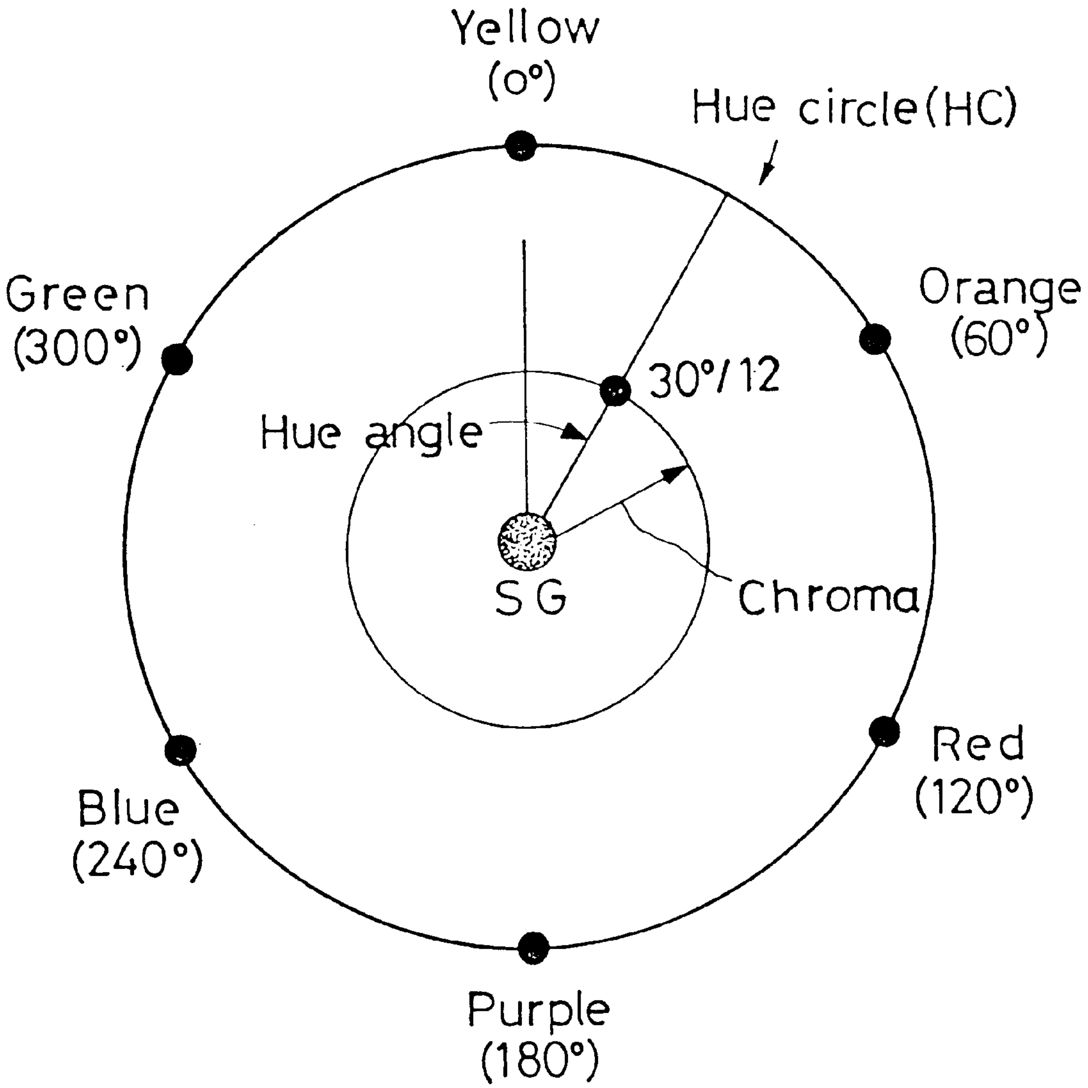
FIG. 1 is a sketch of a hue sheet arrangement of the color comparison list clearly showing a hue angle concept of the present invention.
Figure 2:
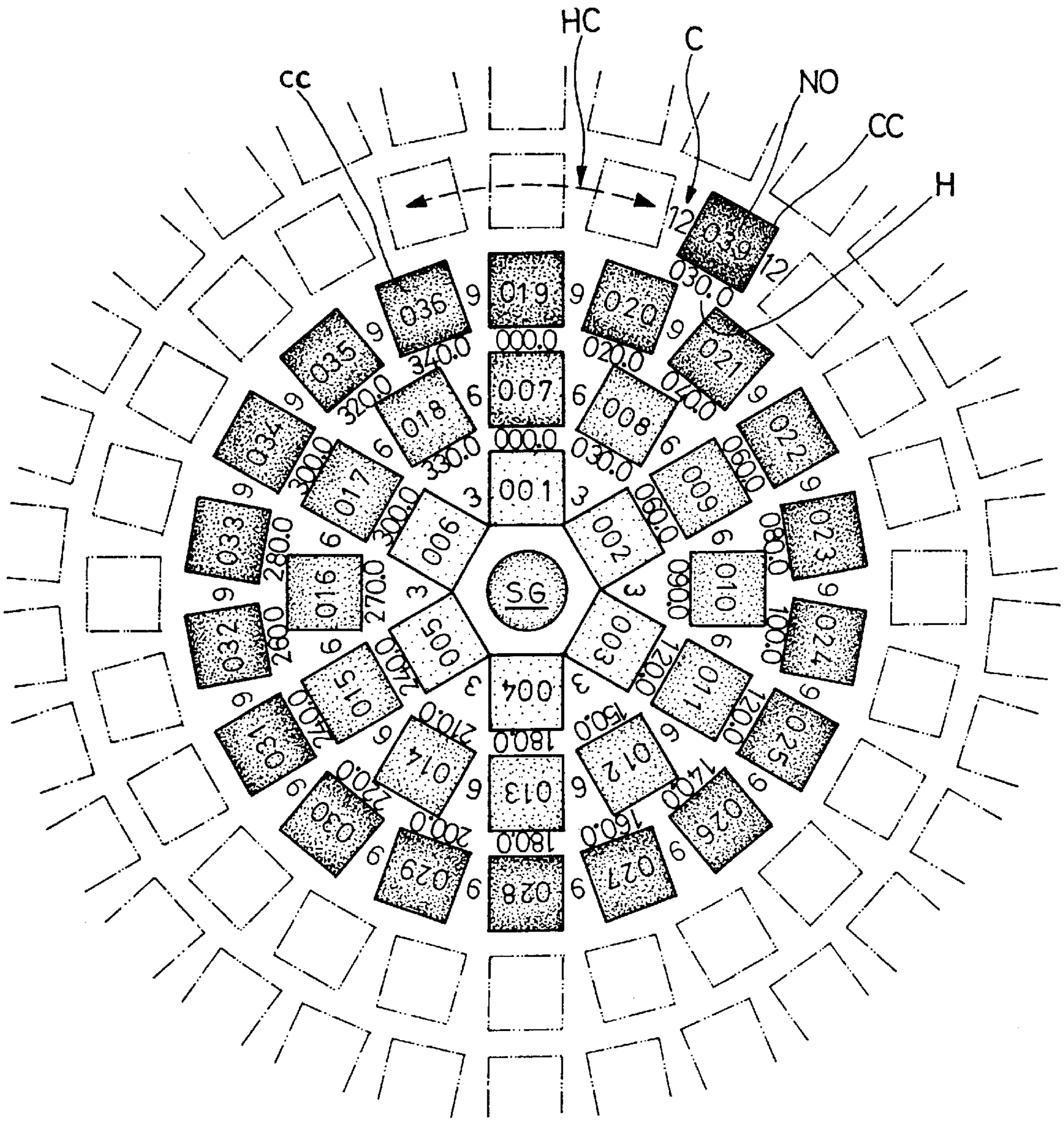
FIG. 2 is a sketch of a hue sheet of color comparison list showing the unique arrangement of the hue blocks of the present invention.

For the basic principles for the invention refer to FIG. 1 where there is shown the most basic sketch of the hue sheet distribution and also accompanying FIG. 2, where there is shown the color language description of the color comparison list. The basic principles are as follows:

1. Hue Angle—By using color change principles, yellow can be mixed with red to produce orange, red can be mixed with blue to produce purple and blue and yellow can be mixed to produce green, thereby creating a perfect 360 degree hue circle according to the color changes of yellow, orange, red, purple, blue, green. As shown in FIG. 1, the hue angle is the color's angle with respect to a reference point, in this example, yellow 0° angle on the hue circle.

2. Chroma—Chroma is the visual perception of yellow, orange, red, purple, blue and green. As the color brightens, the chroma increases. As the color perception of yellow, orange, red, purple, blue and green diminishes to nothing, the chroma decreases. When the level of chroma is zero, the color is then standard gray (SG) which is the central color of the hue squares. FIG. 1, FIG. 2, shows the positions of hue angle 30° (030,0) and chroma 12 on the hue circle.

3. Depth—Depth is the sensation of lightness or darkness of color. Regarding the arrangement of the color solid, as the depth increases, the hue angle decrease and as the color lightens, the hue angle increases.

Using the aforementioned color language, the invention's principle and methods for creating hue sheets of identical depth are as follows:

Principle—Use standard gray (SG) (the central area of each hue sheet) to calibrate, or identify, color depth of all of the color squares on the hue sheet.

Method—By mixing colors positioned at equivalent distance (at least three spaces away from each other) at any hue angle of the hue circle (360°) in the hue sheet, the central color standard gray (SG) is obtained. The distance between the central gray area and any hue circle on the hue sheet shall be equal at any hue angle. Hue circles of the same chroma also have the same value and the distance between its hues must be uniform and identical in their visual perception.

In FIG. 2, showing the hue sheet of the invention, the central color of the hue sheet is the standard gray (SG) which calibrates and identifies the entire hue sheet's color depth. At each color (CC), also referred to as a color block, the number shown in the center thereof is the hue number (No); the hue angle (H) is located beneath the hue block; and the chroma (C) is located to the left of the hue block. The mixing of any three colors (or multiple of three, i.e., six, nine, etc. colors) positioned at equivalent distance away from each other at any hue angle of the hue circle (360°) will produce the central standard gray (SG). For example, after Nos. 001, 003, 005 colors at the chroma 3 of the hue circle are mixed together, the result will be standard gray (SG); and after Nos. 019, 025, 031 colors, or 019, 022, 025, 028, 031, 034 colors (C) at the chroma 9 of the hue circle also will be standard gray. Moreover, the hue blocks disclosed at any angle (000.0>120.0>240.0>360) of the same hue circle (3 or 6, 9 . . . ) on the hue sheet, are positioned at the same hue distance from the SG area in the center of the hue sheet. Then, hue circles of the same chroma are also of the same value, their color distances are the same and are identical I visual perception. In addition, the hue sheet shows a range from no color at the central axis to a high chroma at the hue circles. The number of hue blocks at each of its hue circles rise in increments of six hue blocks in the direction from a hue circle having a lower chroma to the adjacent hue circle having a higher chroma. For example, the hue circle at the first circle has six hue blocks; the second circle has twelve; the third has eighteen. As shown in FIG. 2, the color at hue angle 30° (030,0) and chroma 12 in the hue sheet of the invention is given the hue number (NO) 039. Therefore, this invention does not just clearly define, but also provides a convenient method of measurement of the color.

Figure 3:
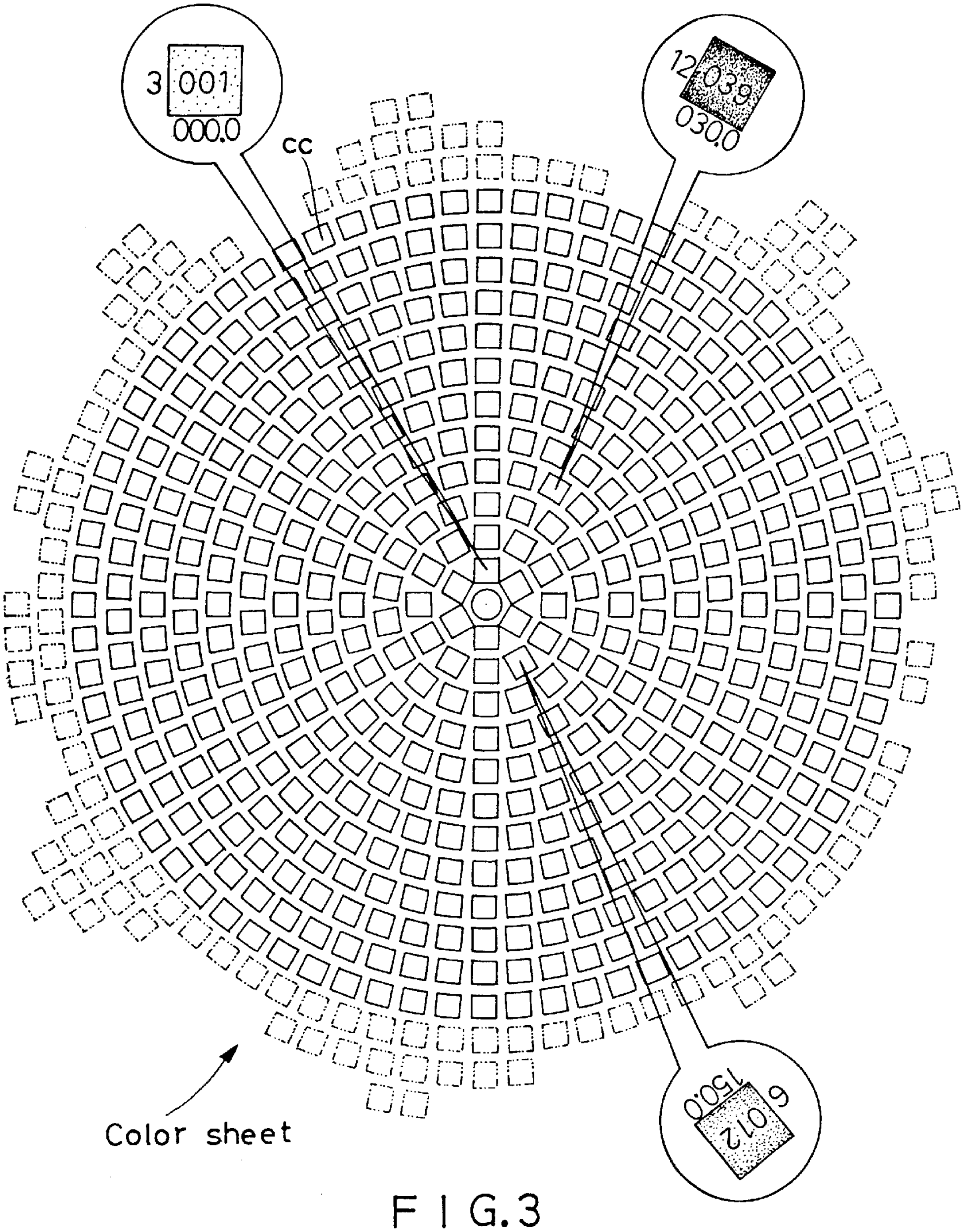
FIG. 3 is a preferred embodiment of the color sheets of the color comparison list.

As shown in FIG. 3, the hue angle and chroma are shown simultaneously on the color sheet. Therefore, one can know the hue angle and chroma of each numbered color and can also compare the adjacent numbers for the best combination for use in matching colors.

Figure 4:
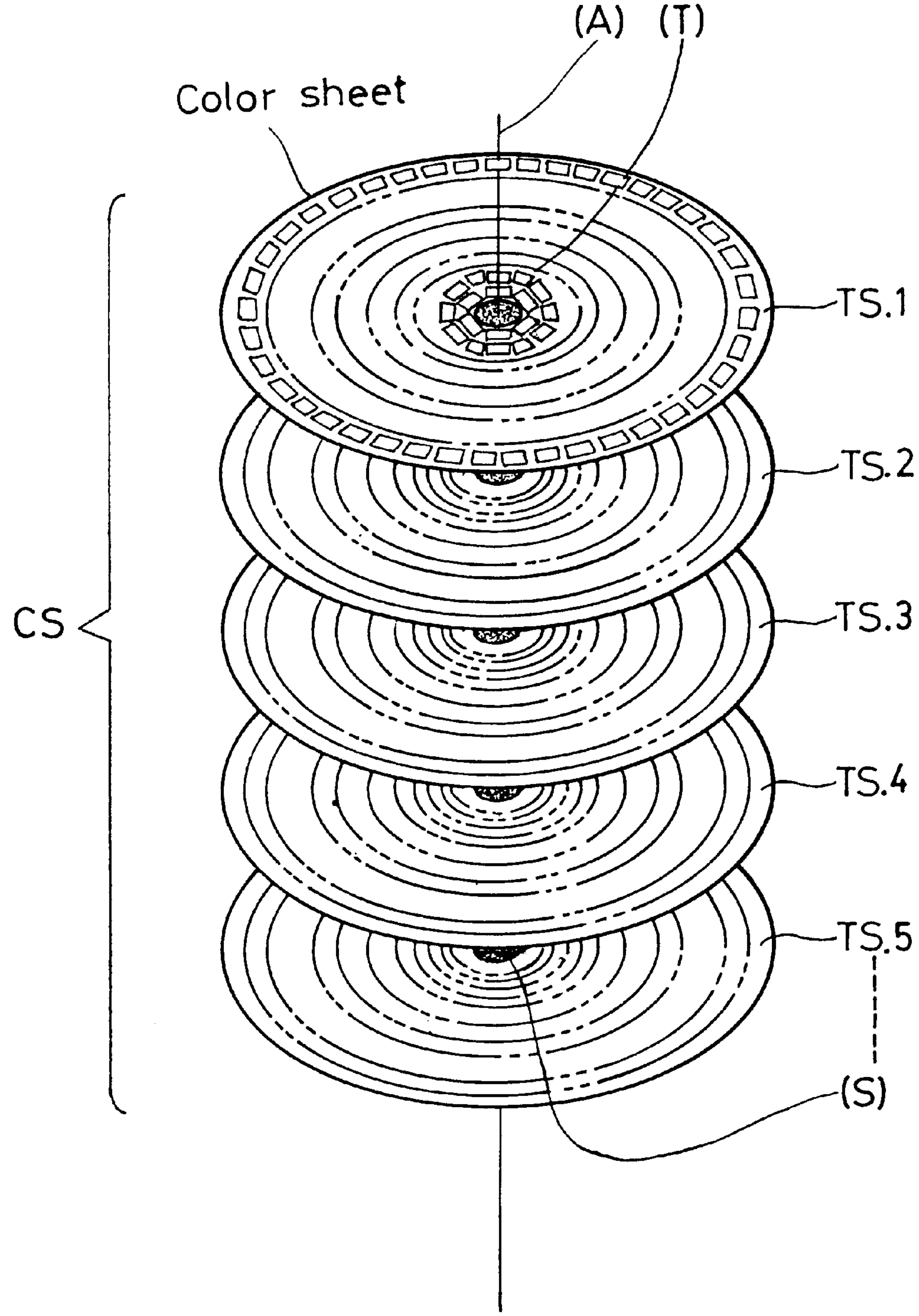
FIG. 4 is a sketch of the 3-dimensional color structure of the color comparison list of the present invention.

As shown in the invention's color solid schematic diagram of FIG. 4, the hue sheets are arranged in such a way that the no color (gray) area at the central axis (A) of each hue sheet changes from the lightest, i.e., tint (T) at the top (TS.1) to the darkest, i.e., shade (S) at the bottom (TS.5) allowing the hue sheets TS.1, TS.2, TS.3 . . . to be arranged from the top to the bottom in a predetermined order, thus forming a color solid (CS).

Figure 5:
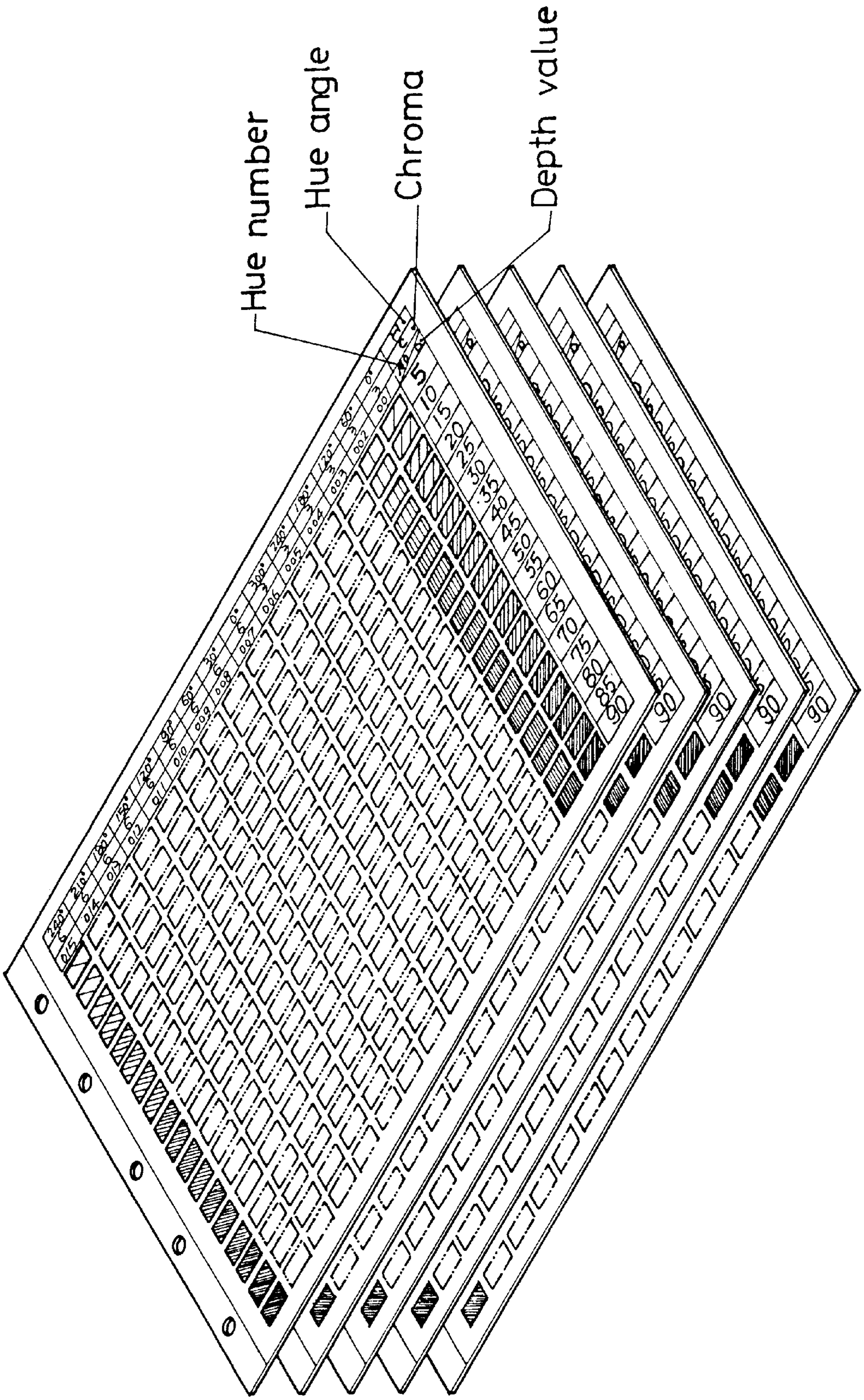
FIG. 5 is a sketch of the tint/shade arrangement method of the color comparison list of the present invention.

As shown in the invention's alternative tint/shade sheet arrangement schematic diagram of FIG. 5, the lay out of the tint/shade sheets is primarily intended to accommodate the use of the invention's color solid. The line (scale) extending at the very top from right to left is the hue angle scale (H). The horizontal arrangement of the second line starts from the no color standard gray (SG) to high chroma. The third line is arranged according to each hue sheet's color number (Nos. 001, 002, 003 . . . ). The depth value scale (D) extends vertically at the right side of the sheet. As one proceeds to the bottom, the depth value increases from the tint (T) to shade (S) in order from the top to the bottom. In this way, a rectangular tint/shade sheet is formed, on which each hue block can be clearly identified by the hue angle, hue chroma and hue depth value.

Figure 6:
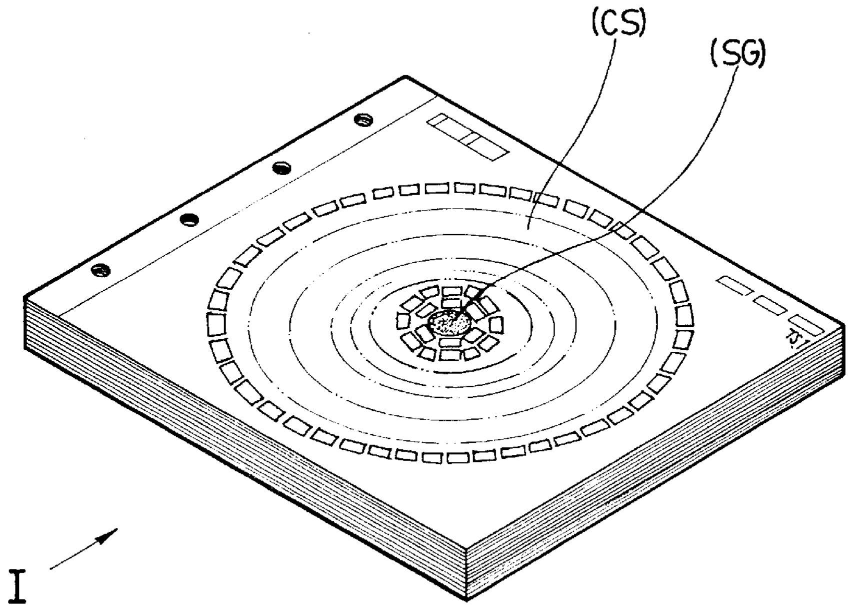
FIG. 6 is a perspective view of the Comparison List of Hue of the present invention.
Figure 7:
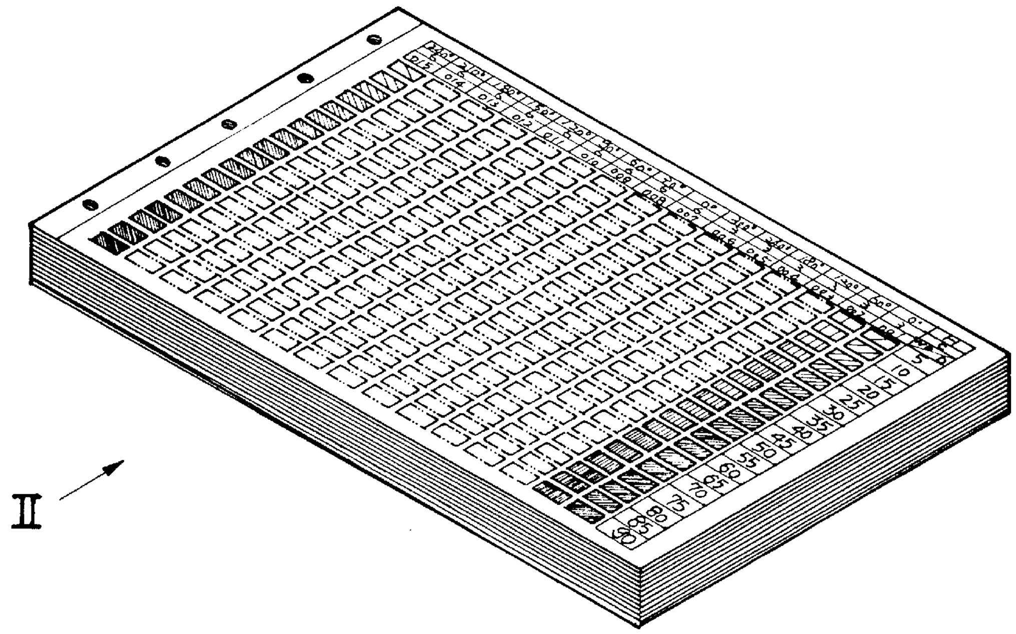
FIG. 7 is a perspective view of the Comparison List of Depth of the present invention.
Figure 8A:
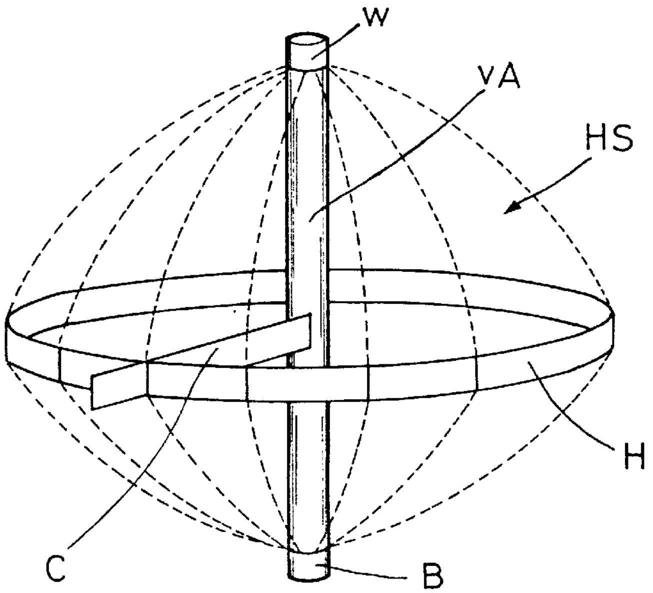
PRIOR ART FIG.8(A)
FIGS. 8(A)–(B) are sketches of a conventional color solid.
Figure 8B:
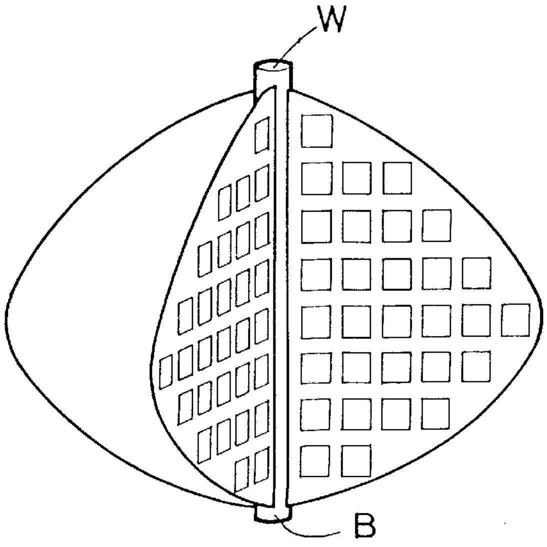
PRIOR ART FIG.8(B)
Figure 9A:
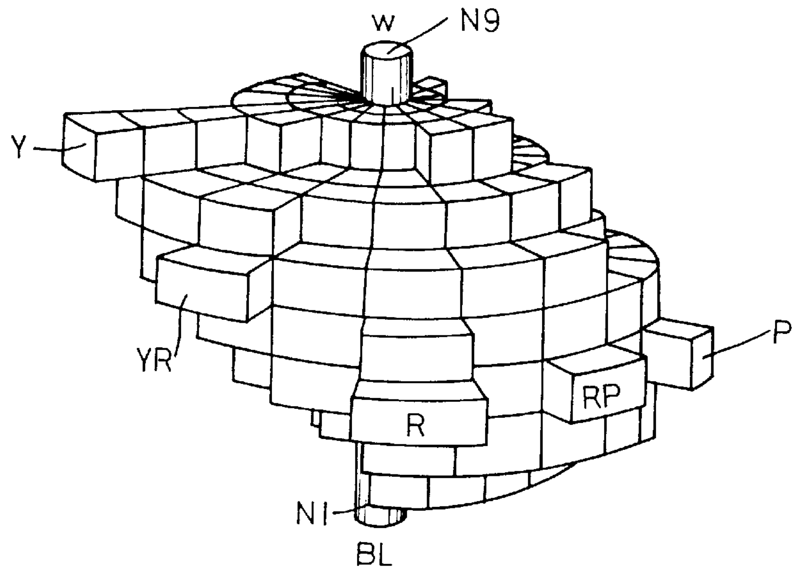
PRIOR ART FIG. 9(A)
FIGS. 9(A)–(B) are sketches of the Munsell notation system.
Figure 9B:
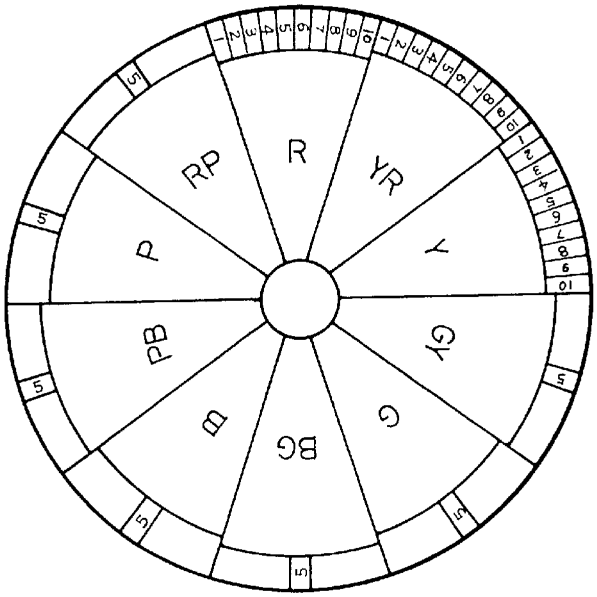
PRIOR ART FIG. 9(B)
Figure 10A:
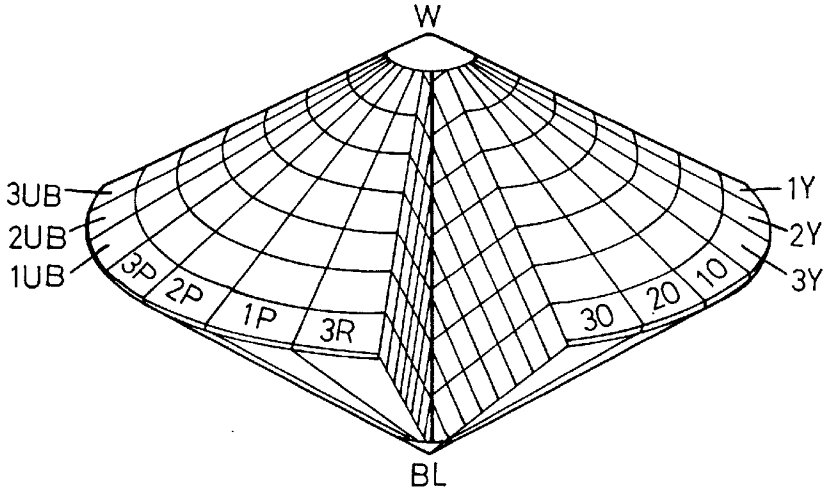
PRIOR ART FIG.10(A)
Figure 10B:
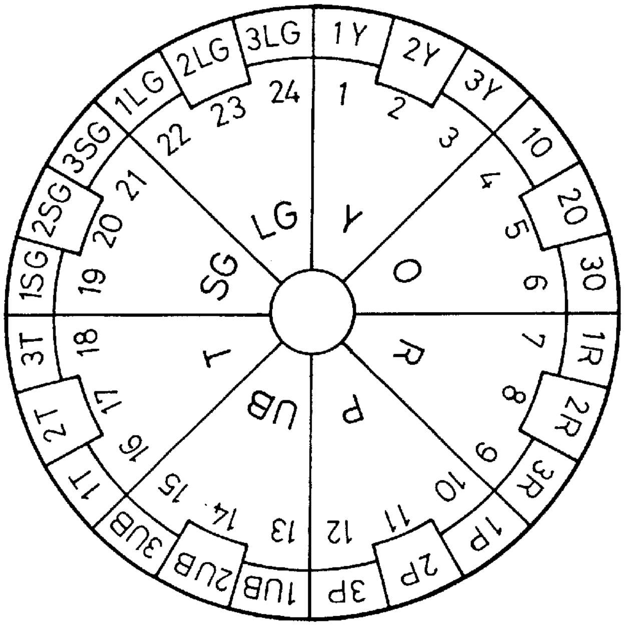
PRIOR ART FIG.10(B)
Figure 11:
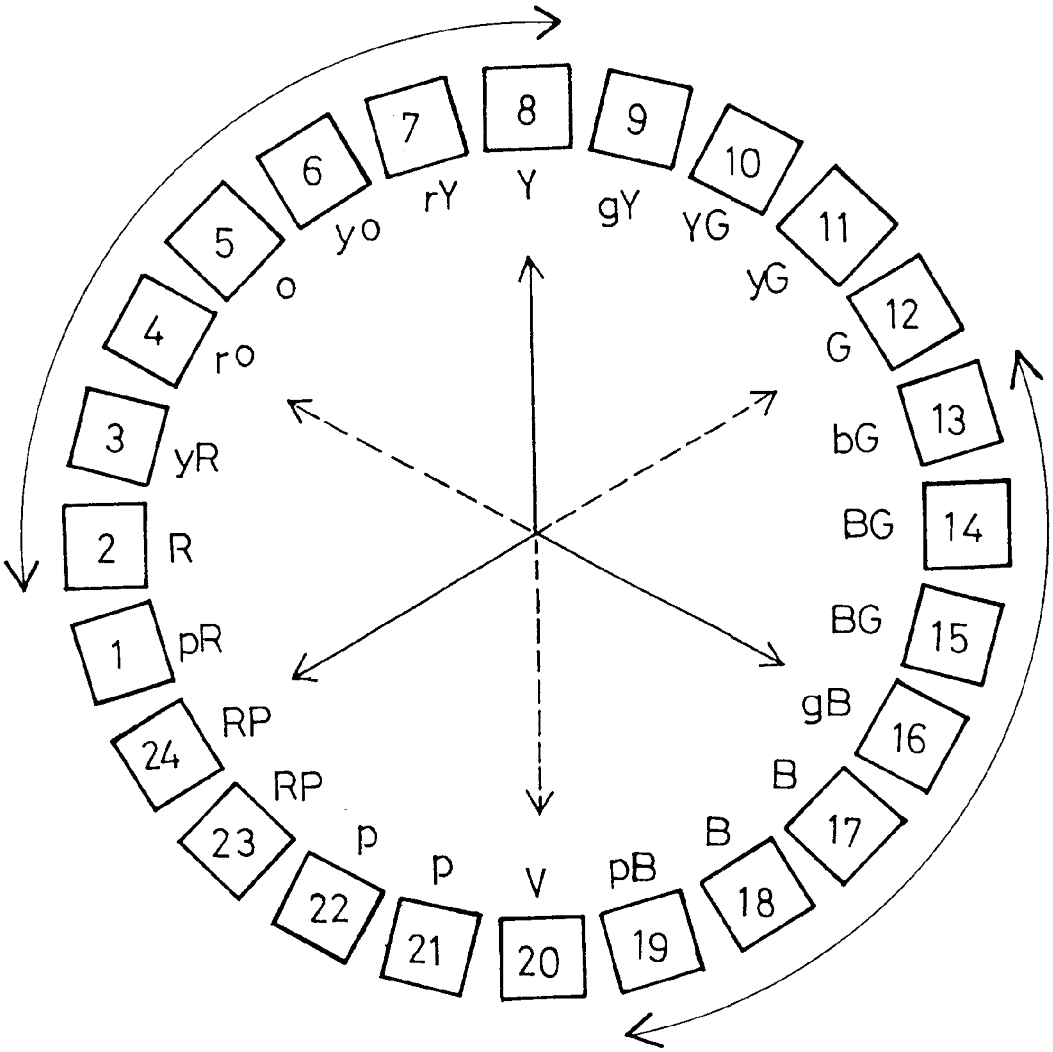
PRIOR ART FIG.11
FIG. 11 is a sketch of the practical color coordinate system of the Japanese Color Research Institute.

Please refer to the invention's Comparison List of Hue in FIG. 6 and the invention's Comparison List of Depth in FIG. 7.

The invention uses the above mentioned color system to make a Comparison List of Hue (I) and Comparison List of Depth (II). The Comparison List of Hue (I) shown in FIG. 6 has standard gray (SG) area as the hue central axis of the color sheet with tints (lower depth value) at the top and shades (higher depth value) at the bottom of the stacked hue sheets. By means of this arrangement, the color solid (CS) is compiled together. In this way, persons in industry have a precise basis in which to select and communicate color. Furthermore, this color system allows for convenience in finding colors that can be reciprocally blended when selecting colors, thus raising the color matching efficiency of the industry.

The above mentioned color solid is created by developing a computer program using a single variable formula to calculate the coloring formula. One can also adjust the divisions, such as intervals between hue circles, or angular intervals between hue blocks, or intervals between depth values of hue sheets, in the overall color system as needed, to control the hue numbers in the color solid. In this color solid (CS), the most crucial color is the middle color in the round hue sheet which is the standard gray. Whether it is accurate or not affects the uniformity of the entire hue sheet, or in other words the division intervals of the hue circles. The equality of the division intervals and the color depth of all of colors both use the standard gray (SG) to balance color depth. Therefore, the vertical divisions between the hue sheets (from the top to the bottom) of the entire color solid (CS), shown in FIG. 4, only require the measuring to be adjusted by the standard gray (SG). In the making of all of the various color solids, they still just require standard gray to accurately calibrate the color depth.

Moreover, the Comparison List of Depth (II) shown in FIG. 7 accompanies the use of the Comparison List of Hue (I), achieving a complementary function. The Comparison List of Depth (II) takes the vocabulary and forms a booklet primarily by means of the rectangular tint/shade arrangement shown in FIG. 5. Its horizontal chroma scale runs from the non color standard gray (SG) to the high chroma arranged according to the color numbers (001, 002, 003, 004 . . . ) of each color sheet with the chroma increasing as one proceeds to the left. The depth value scale extending from the top to the bottom of the hue sheets in the color solid (CS) is identical, being arranged from tint (T) at the top, depth value 5, to shade (S) at the bottom, depth value 90. Therefore, the Comparison List of Depth (II) can clearly show the vertical changes of color depth in the above mentioned color solid and Comparison List of Hue. Persons in the industry, therefore, can clearly understand the hue angle, chroma and depth of a color in the whole color system.

The basic structure of the color solid can validate the necessity of having three distinct directional languages, and of the conventional attributes of hue, chroma and value, where hue is discussed separately and chroma and value are combined to form a the integrated concept of color depth. In addition, hue cannot be clearly independent in the three directional color language of the color solid because hue or colored light cannot be expressed in just a single directional color language. The color language system of this invention defines hue as the hue angle plus the chroma. Moreover, the strong propensity for the simultaneous change of chroma and color depth easily creates confusion and cannot be made clearly distinct from one another. Through changes in the coloring quantity in dyes, colors or pigments in the technical field of demonstrating the expected color, changes in coloring quantity have a direct relationship with the quantification of the color depth. The invention thus uses the concept of color quantity to create an idea of the color depth and the directional color languages of hue angle, chroma and color depth to set up a color solid in which the hue angle and chroma are combined and named hue the hue or colored light of any color can be named and the color depth possesses a significant independence. By means of this structure, any color can be simply and clearly communication through this color language, achieving the functions of accurate and convenient color language conveyance, color measurement and color design.

What is claimed is:

1. A hue comparison device, comprising:

means for substantially precise identification of a hue by a hue angle, hue chroma and hue depth value, said identification means comprising:

a plurality of hue sheets arranged in a three-dimensional structure, each said hue sheet including:

(a) a central standard gray area located in the center of said hue sheet, and (b) a plurality of hue blocks filled with respective hues displayed on said each hue sheet, each of said hue blocks occupying a predetermined angular position on said hue sheet with the hue angle thereof corresponding to said angular position identifying a particular spectrum area of the hue filling said hue block, wherein said hue blocks are arranged on said hue sheet in a plurality of coaxial hue circles surrounding said central standard gray area, with hue blocks of the same hue circle being equidistantly displaced from said central standard gray area and having the same chroma parameter, wherein said chroma parameter of the hue circles increases in predetermined increments in the direction from the center to periphery of said hue sheet, wherein the difference in the number of the hue blocks in adjacent hue circles equals six hue blocks, wherein said standard gray is being obtained as a result of mixing together of at least three hues of the hue blocks spaced equidistantly on the same hue circle, and wherein, in said three-dimensional structure, said hue sheets being arranged in a predetermined order with said central standard gray area changing from the darkest to the lightest in predetermined increments of the standard gray.

2. The hue comparison device of claim 1 further comprising:

a plurality of rectangular sheets having a plurality of hue blocks filled with respective hues displayed thereon, a hue angle scale extending horizontally at the top of each rectangular sheet, a hue chroma scale extending in parallel to said hue angle scale and adjacent thereto, and a depth value scale intersecting with said hue angle and hue chroma scales and extending from the top to the bottom of said rectangular sheet, whereby each hue being identified by position of a respective hue block relative to said hue angle, hue chroma and depth value scales.

3. The hue comparison device of claim 1, wherein each hue is further identified by a hue number displayed inside of a respective hue block, with said hue angle displayed beneath said respective hue block, and said hue chroma displayed at at least one side of said respective hue block.

* * * * *